US006308885B1

(12) United States Patent
Douglass

(10) Patent No.: US 6,308,885 B1
(45) Date of Patent: Oct. 30, 2001

(54) HEATED COIN BOX

(76) Inventor: Bruce Douglass, 850 S. Tipsico Lake Rd., Milford, MI (US) 48380

( * ) Notice: Subject to any disclaimer, the term of this patent is extended or adjusted under 35 U.S.C. 154(b) by 0 days.

(21) Appl. No.: 09/574,828

(22) Filed: May 19, 2000

(51) Int. Cl.[7] .......... B65G 11/04

(52) U.S. Cl. .......... 232/57.5; 232/64; 232/1 D; 194/350

(58) Field of Search .......... 232/57.5, 64, 65, 232/66, 1 D, 15, 16; 206/0.8, 0.81; 194/350; 453/63

(56) References Cited

U.S. PATENT DOCUMENTS

| | | | | |
|---|---|---|---|---|
| 2,821,321 | | 1/1958 | McQuiston et al. . | |
| 4,579,214 | * | 4/1986 | Volk | 194/350 |
| 4,638,908 | | 1/1987 | Baitz et al. . | |
| 4,757,941 | * | 7/1988 | Hosterman et al. | 232/16 |
| 4,846,333 | | 7/1989 | Kissick . | |
| 5,211,275 | * | 5/1993 | Halsey et al. | 194/350 |
| 5,554,070 | * | 9/1996 | Takatoshi et al. | 453/63 X |
| 5,857,417 | | 1/1999 | Hart . | |
| 5,941,454 | * | 8/1999 | Hosterman | 232/16 |

* cited by examiner

*Primary Examiner*—B. Dayoan
*Assistant Examiner*—William L. Miller
(74) *Attorney, Agent, or Firm*—Howard & Howard

(57) ABSTRACT

A vending machine (10) having a coin receiver (14) for actuating a water spray nozzle (16) in a self-serve car wash. A coin tray (18) is disposed adjacent the coin receiver (14). The machine is characterized by a heater (20) for heating the coin tray (18) to heat coins disposed in the coin tray (18) to prevent moisture from freezing on the coins.

10 Claims, 2 Drawing Sheets

HEATED COIN BOX

BACKGROUND OF THE INVENTION

1. Field of the Invention

A coin-operated vending machine of the type including a coin tray disposed adjacent the coin receiver.

2. Description of the Prior Art

A coin-operated vending machines typically include a switching device having a coin receiver and responsive to metallic coins inserted into the coin receiver for actuating a dispenser. Some machines include a coin tray disposed adjacent the coin receiver for storing coins for use in the machine. An example of such a machine is disclosed in U.S. Pat. No. 4,846,333 to Kissick.

Some coin-operated vending machines are used in open air environments, which can be very hostile, as in the winter in the northern United States. An example of such a machine is disclosed in U.S. Pat. No. 5,857,417 to Hart wherein a coin-operated machine dispenses air in a gasoline station. Such coin-operated vending machines are also used to dispense water in self serve car washes. Using coins in such cold environments to dispense water can be troublesome if the temperature is below freezing.

SUMMARY OF THE INVENTION AND ADVANTAGES

A coin operated vending machine comprising a switching device having a coin receiver and responsive to metallic coins inserted into the coin receiver for actuating a dispenser and a coin tray disposed adjacent the coin receiver. The machine is characterized by a heater for heating the coin tray to heat coins disposed in the coin tray.

Accordingly, the subject invention provides a solution to the problem of coins having ice thereon in below freezing temperatures.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
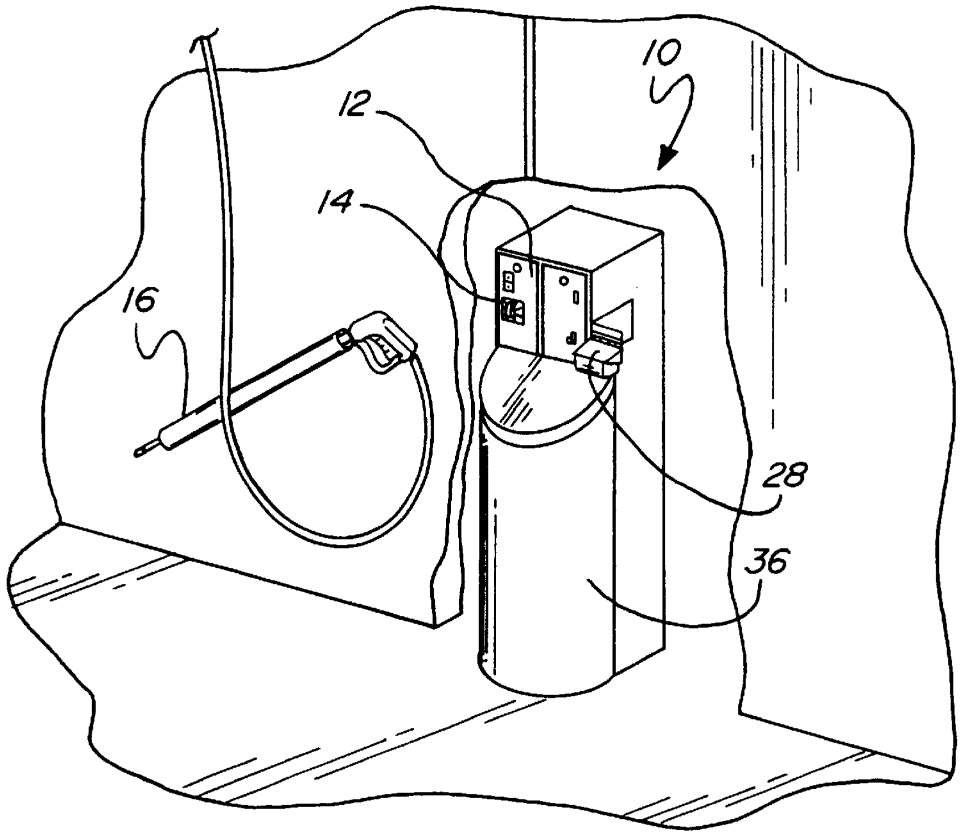
FIG. 1 is a fragmentary perspective view of the subject invention in a car wash environment.
Figure 2:
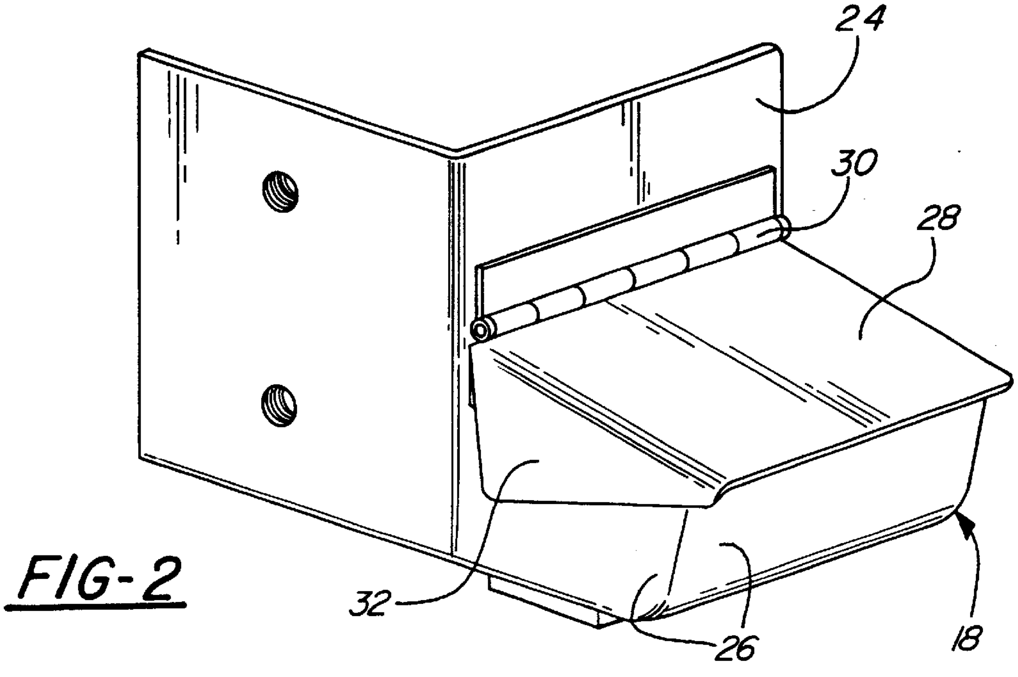
FIG. 2 is a perspective view of the coin tray of the subject invention.
Figure 3:
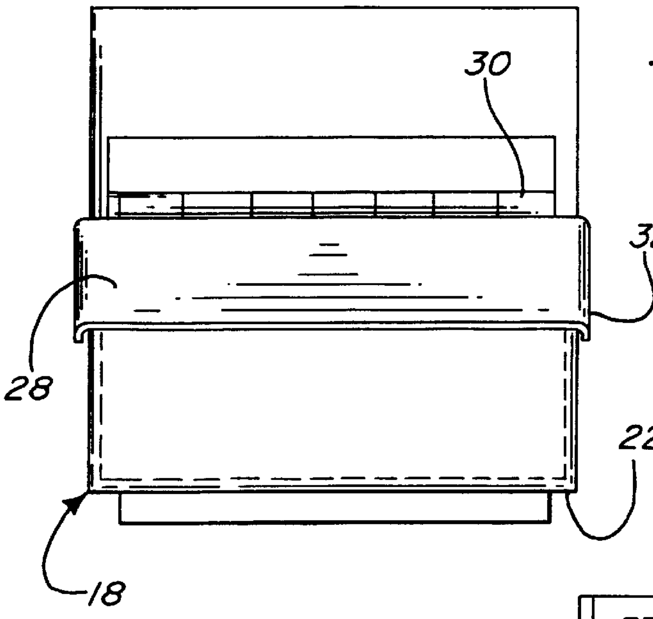
FIG. 3 is a front view of the coin tray of the subject invention.
Figure 4:
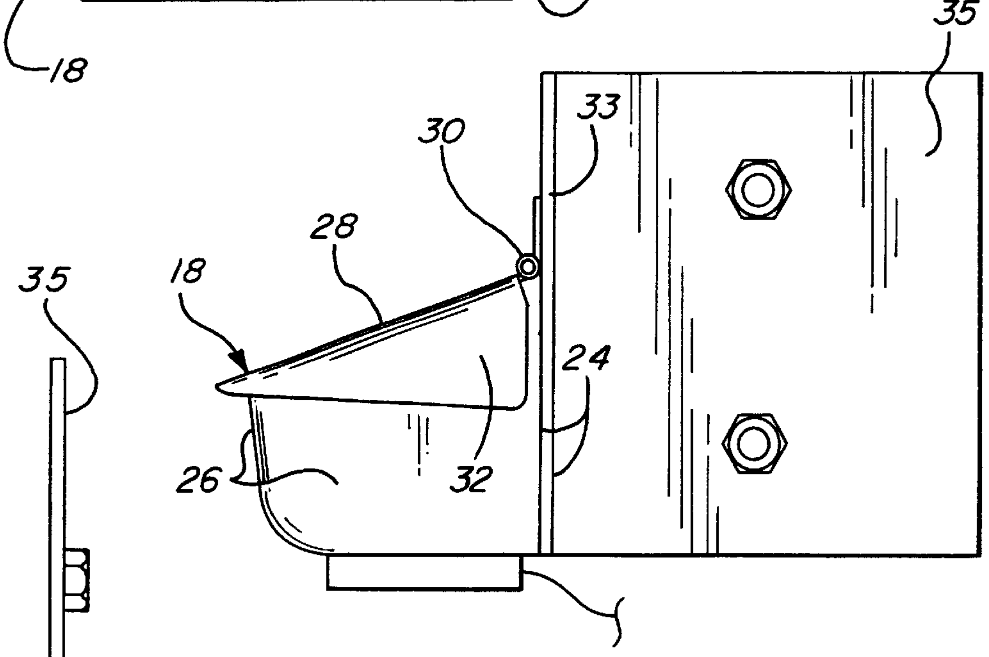
FIG. 4 is a right side view of FIG. 3.
Figure 5:
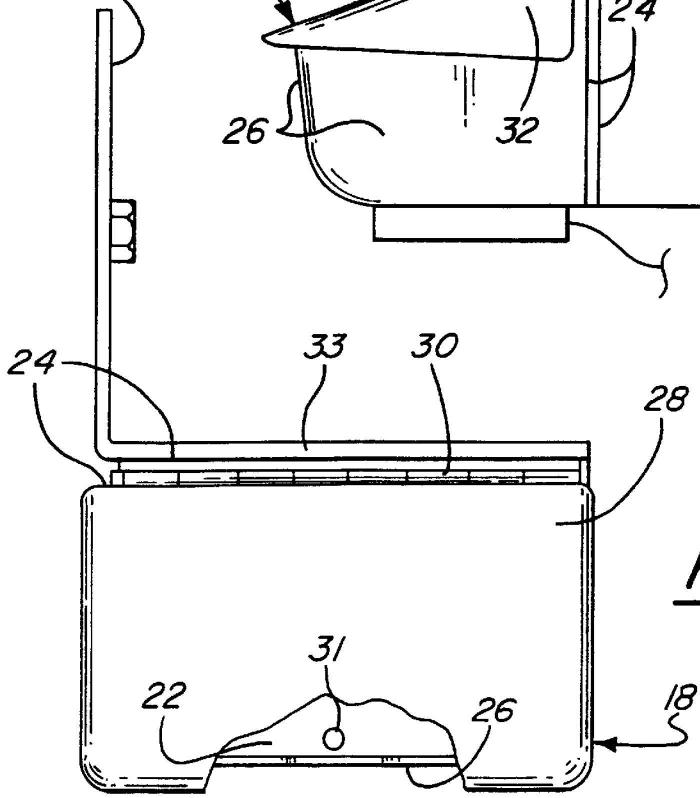
FIG. 5 is a top view of FIG. 3 partially broken away.

Referring to the Figures, wherein like numerals indicate like or corresponding parts throughout the several views, a coin operated vending machine is generally shown at 10.

The machine 10 includes a switching device 12 having a coin receiver 14 and responsive to metallic coins inserted into the coin receiver 14 for actuating a dispenser, the dispenser being shown as a water spray nozzle 16. The spray nozzle is of the type used in a self-serve car wash. The coin receiver 14 receives coins to electrically turn on a valve to allow water to flow through the spray nozzle for a predetermined period of time. That is, the coin receiver 14 also includes a timer for timing the predetermined period of time the water is allowed to flow through the spray nozzle 16.

In order for an operator to have a supply of coins readily available for successive actuation of the water dispenser, a coin tray 18 is disposed adjacent the coin receiver 14. The machine is characterized by a heater 20 for heating the coin tray 18 to heat coins disposed in the coin tray 18. The tray 18 includes a bottom 22 and a back wall 24 and peripheral walls 26, the heater 20 being disposed on the outside of the bottom 22. The heater 20 includes an electrically operated heat generator, e.g., a high resistance coil. The tray 18 is made of a high heat conductive metal for facilitating the transfer of thermo energy generated by the heater 20.

The coin tray 18 includes a top 28 engaging the walls, the top 28 being hinged to the back wall 24 for movement between a closed position engaging the walls and an open position disposed above the peripheral walls 26. More specifically, a piano hinge 30 interconnects the top 28 and the back wall 24. The top 28 slants downwardly from the piano hinge 30 to the front peripheral wall and includes triangular sides 32 for engaging the side walls. The bottom 22 includes a drain hole 31 for draining moisture from said tray 18.

The back wall 24 is defined by one leg 33 of an L-shaped bracket 34, the other leg 35 supporting the coin tray 18 on the machine. The back wall 24 of the tray 18 may be defined by the leg 33 of the bracket 34 or may be a separate and independent element.

As is well known in the art, a vault 36 is included for receiving and securing the coins.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A machine comprising;

a switching device (12) having a coin receiver (14) and responsive to metallic coins inserted into said coin receiver (14) from the exterior thereof for actuating a dispenser, a coin vault (36) for receiving coins from said coin receiver (14), and a coin tray (18) disposed adjacent to and on the exterior of said coin receiver (14) and said vault (36), said machine characterized by a heater (20) for heating said coin tray (18) to heat coins disposed in said coin tray (18).

2. A machine as set forth in claim 1 wherein said dispenser comprises a water dispenser.

3. A machine as set forth in claim 2 wherein said water dispenser consists of a spray nozzle (16).

4. A machine as set forth in claim 1 wherein said heater (20) includes an electrically operated heat generator.

5. A machine as set forth in claim 1 wherein said coin tray (18) is made of heat conductive material.

6. A machine comprising;

a switching device (12) having a coin receiver (14) and responsive to metallic coins inserted into said coin receiver (14) for actuating a dispenser, a coin tray (18) disposed adjacent said coin receiver (14), said tray (18) including a bottom (22) and a back wall (24) and peripheral walls (26), said machine characterized by a heater (20) being disposed on said bottom (22) for heating said coin tray (18) to heat coins disposed in said coin tray (18).

7. A machine as set forth in claim 6 wherein said coin tray (18) includes a top (28) engaging said walls, said top (28) being hinged to said back wall (24) for movement between a closed position engaging said walls and an open position disposed above said peripheral walls (26).

8. A machine as set forth in claim 7 wherein said back wall (24) is defined by one leg (33) of an L-shaped bracket (34), the other leg (35) supporting said coin tray (18) on said machine.

9. A machine as set forth in claim 8 including a piano hinge (30) interconnecting said top (28) and said back wall (24).

10. A machine as set forth in claim 6 wherein said bottom includes a drain hole for draining moisture from said tray (18).

* * * * *